Figures 1, 2:
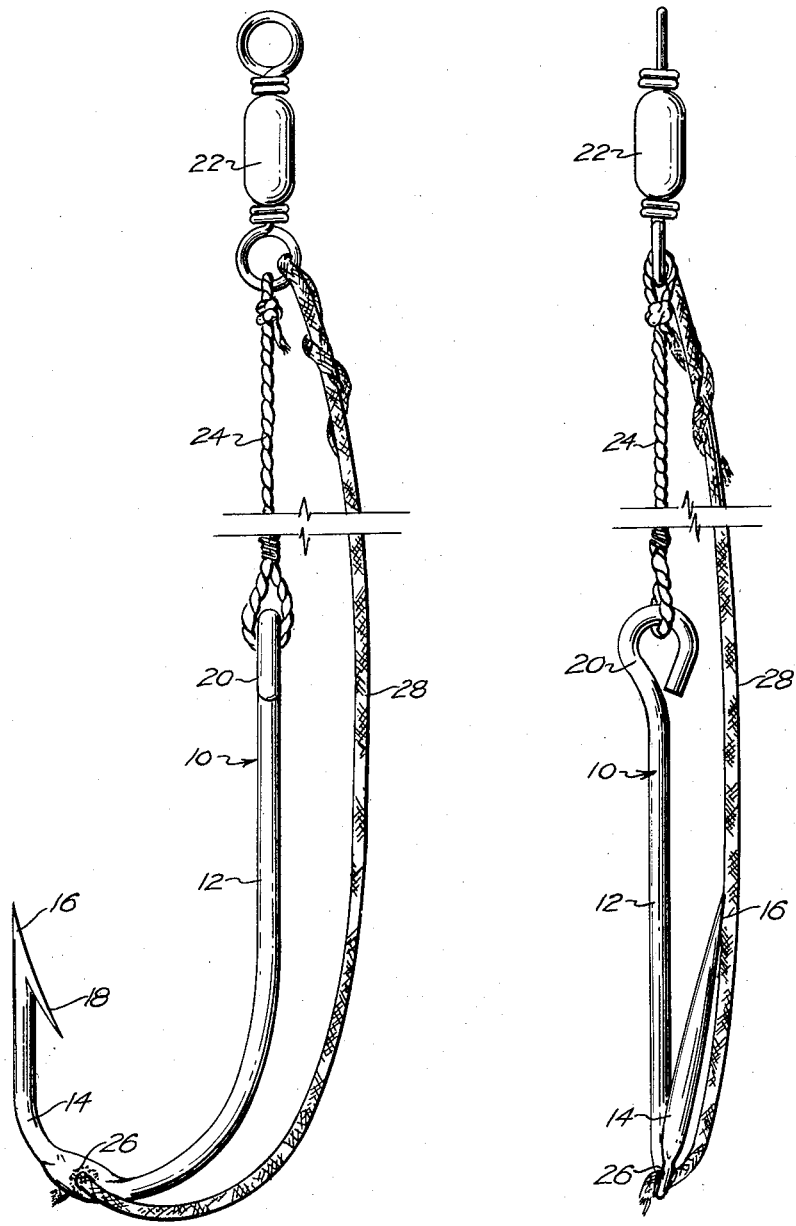

INVENTOR.
Roy J. Behee

United States Patent Office 2,823,486
Patented Feb. 18, 1958

2,823,486

EASILY REMOVABLE FISHHOOK

Roy J. Behee, Leavenworth, Kans.

Application May 14, 1956, Serial No. 584,703

1 Claim. (Cl. 43—43.16)

This invention relates to improvements in fishing tackle and more particularly to an easily removable fishhook, the primary object being to provide structure associated with and operably connected to the fishhook itself for facilitating removal of the hook from the mouth of a fish.

It is the most important object of the present invention to provide a pulling element permanently attached to the fishhook which may be utilized by the fisherman after he has made a "catch" to impart the proper swinging movement to the fishhook while the same is in the mouth of the fish for causing the hook to become disengaged and thereby rendered easily removable from within the mouth of the fish.

Another important object of the instant invention is the provision of a removal means for fishhooks taking the form of a loosely hanging cable attached at one end thereof to the fishhook at a strategic point for facilitating removal and attached at the opposite end thereof in any suitable manner to the fishline itself.

In the drawing:

Figure 1 is a side-elevational view of an easily removable fishhook made pursuant to my present invention; and Fig. 2 is an edge-elevational view thereof.

The improvements forming the subject matter of the instant invention may be utilized in connection with virtually any type of conventional fishhook and, therefore, there has been chosen for illustration in the drawing a fishhook broadly designated by the numeral 10 and provided with a shank 12 together with a substantially U-shaped hook 14 that is in turn provided with a sharpened barb 16 at the free end thereof which projects laterally in a sharpened prong 18.

The shank 12 is provided with an eye 20 in the usual manner permitting attachment thereof to a fishing line through the medium of a fastener 22 and a leader or the like 24 connected with the fastener 22 and with the eye 20.

In accordance with the principles of the instant invention, the hook 14 is provided with a side hole 26 disposed substantially at the bight thereof for receiving one end of a flexible cable 28 that may be attached to the hook 14 in any suitable manner such as by upsetting the metal from which the hook 14 is made, by brazing, soldering or the like. The opposite end of the cable 28 is attached to the fastener 22 as is clear in the drawing.

When the fishhook 10, leader 24 and fastener 22 are stretched out in a taut condition as illustrated in the drawing, the cable 28 is relatively loose, thereby not interfering in any manner with the normal use of the fishing equipment during casting and snaring a fish within the water. By the same token, after the fish is caught on the hook 10, the cable 28 will not interfere in any manner nor aid the fish in any way so far as disengaging himself from the hook 10 is concerned.

After the fish has been pulled ashore, however, it is a simple matter to remove the hook 14 from his mouth by exerting a pulling action on the cable 28. In this respect, it is to be noted that by virtue of attachment of the cable 28 at the bight of the hook 14 the pulling action upon cable 28 tends to rotate the hook 14 in a direction for disengaging the barb 16 as well as the prong 18. This differs, of course, from the conventional straight pulling action that is attempted when the fisherman pulls on the shank 12 and by virtue of the improvements of the instant invention, the use of various types of tools, including so-called fishhook removers, is eliminated.

It requires very little skill on the part of the fisherman to soon learn how to simultaneously manipulate the shank 12 and the cable 28 in order to disengage the prong 18 and the barb 16 from within the flesh of the mouth of the fish so that the fishhook 10 can be easily pulled from within the mouth of the fish.

Having thus described the invention, what is claimed as new and desired to be secured by Letters Patent is:

Fishhook structure comprising an elongated, rigid shank provided with an eye at one end thereof; a substantially U-shaped, rigid hook portion having a first leg integral with and extending from the other end of the shank, a bight integral with and extending from the extremity of the first leg remote from the shank, a second leg integral with and extending from the extremity of the bight remote from the first leg, and a barb integral with and disposed at the extremity of the second leg remote from the bight, said bight being provided with a hole therethrough intermediate its extremities; an elongated, flexible element passing through the hole adjacent one end thereof and secured only to the bight at said end thereof, said element extending from said one end thereof along the shank; and means adapted for securing said eye of the shank and the other end of the element to a fishing line.

References Cited in the file of this patent

UNITED STATES PATENTS

| 551,844 | Benedict | Dec. 24, 1895 |
| 1,333,148 | Anderson | Mar. 9, 1920 |
| 2,618,881 | Gorrias | Nov. 25, 1952 |